United States Patent [19]

Caridis et al.

[11] 4,366,749
[45] Jan. 4, 1983

[54] APPARATUS FOR PROCESSING FOOD PRODUCTS

[75] Inventors: Andrew A. Caridis, Foster City; Lawrence F. Klein, Hillsborough; Clark K. Benson, Millbrae, all of Calif.

[73] Assignee: Heat and Control, Inc., South San Francisco, Calif.

[21] Appl. No.: 248,203

[22] Filed: Mar. 27, 1981

Related U.S. Application Data

[62] Division of Ser. No. 698,276, Jun. 21, 1976, abandoned.

[51] Int. Cl.³ .......................................... A47J 37/12
[52] U.S. Cl. ............................... 99/339; 99/353; 99/355; 99/404; 99/407; 426/438
[58] Field of Search .............. 426/438, 439, 440, 441; 99/339, 404, 405, 406, 443 C, 407, 352, 353, 403, 355

[56] References Cited

U.S. PATENT DOCUMENTS

| | | | |
|---|---|---|---|
| 1,236,405 | 8/1917 | Cleveland | 99/404 X |
| 1,821,689 | 9/1931 | Broeg | 426/439 X |
| 2,112,309 | 3/1938 | Santillan | 99/339 |
| 2,219,410 | 10/1940 | Bradshaw | 99/405 X |
| 2,286,644 | 6/1942 | Pringle et al. | 99/339 X |
| 2,855,308 | 10/1958 | Buechele et al. | 426/438 |
| 2,934,001 | 4/1960 | Cunningham et al. | 99/404 |
| 3,209,678 | 10/1965 | Benson et al. | 99/406 |
| 3,309,981 | 3/1967 | Benson et al. | 99/407 X |
| 3,353,962 | 11/1967 | Smith | 426/438 X |
| 3,576,674 | 4/1971 | Liepa | 426/439 |
| 3,733,202 | 5/1973 | Marmor | 426/441 |

FOREIGN PATENT DOCUMENTS

| | | | |
|---|---|---|---|
| 1279955 | 11/1961 | France | 99/339 |
| 639895 | 7/1950 | United Kingdom | 99/339 |

OTHER PUBLICATIONS

Matz, "Bakery Technology and Engineering" 2nd Ed. Avid Publish. Co., 1972 p. 75.
Pyler, "Baking Science & Technology", vol. 1, Siebel Pulish. Co., Chicago, pp. 454, 455, 572.

*Primary Examiner*—Billy J. Wilhite
*Attorney, Agent, or Firm*—Flehr, Hohbach, Test, Albritton & Herbert

[57] ABSTRACT

Method and apparatus is disclosed for processing food products such as potato chips and the like. A frying medium mist is contained in a vat in which the water vapor or steam being released from the product and the frying medium being generated rises upwardly through a pre-treatment chamber in which a pair of superposed perforate conveyors are mounted. The product is sliced or cut into parts which are conveyed to the feed end of the upper conveyor. The upper conveyor moves the product in a path along the length of the vat for discharge onto the lower conveyor, which moves the product along a reverse path for discharge into the vat. The product passes through the chamber in an atmosphere of the frying medium mist and steam. The speed of the conveyors is selectively controlled at a rate which causes the product to remain in contact with the atmosphere for an optimum dwell time for partial cooking as the frying medium mist and steam deposit on the product. A plurality of paddle wheels are rotated in the vat for controlling the rate of movement of the product through the heated frying medium for an optimum final cooking time.

4 Claims, 4 Drawing Figures

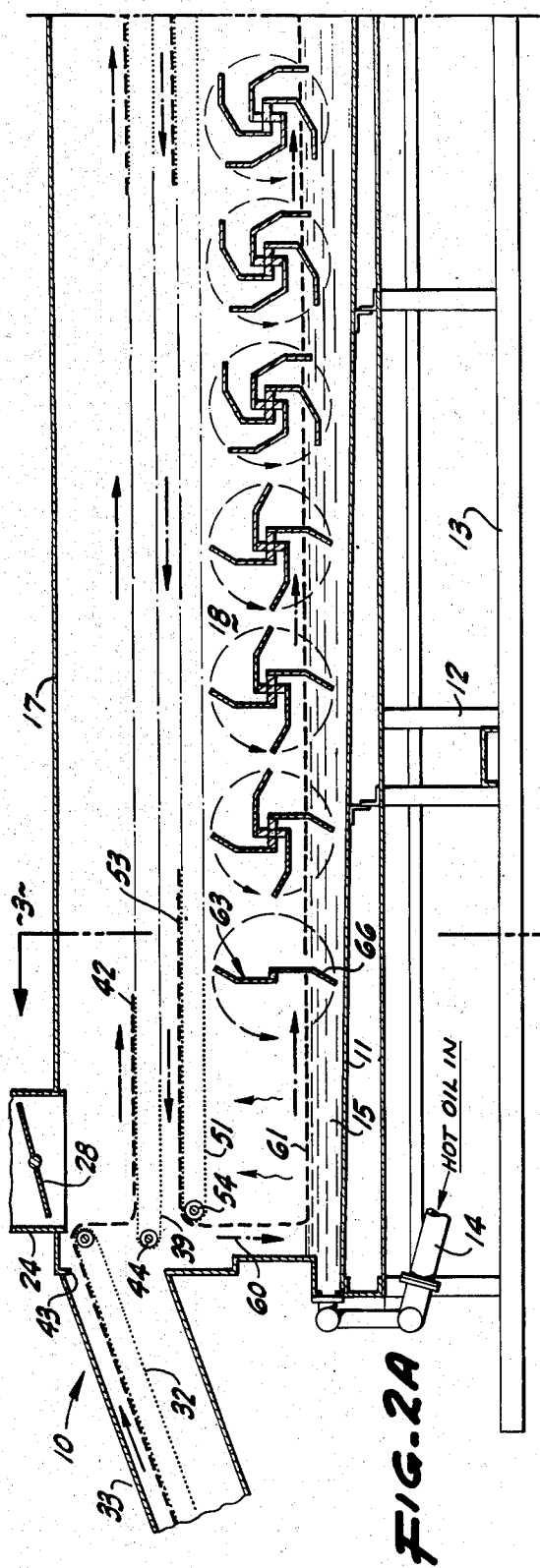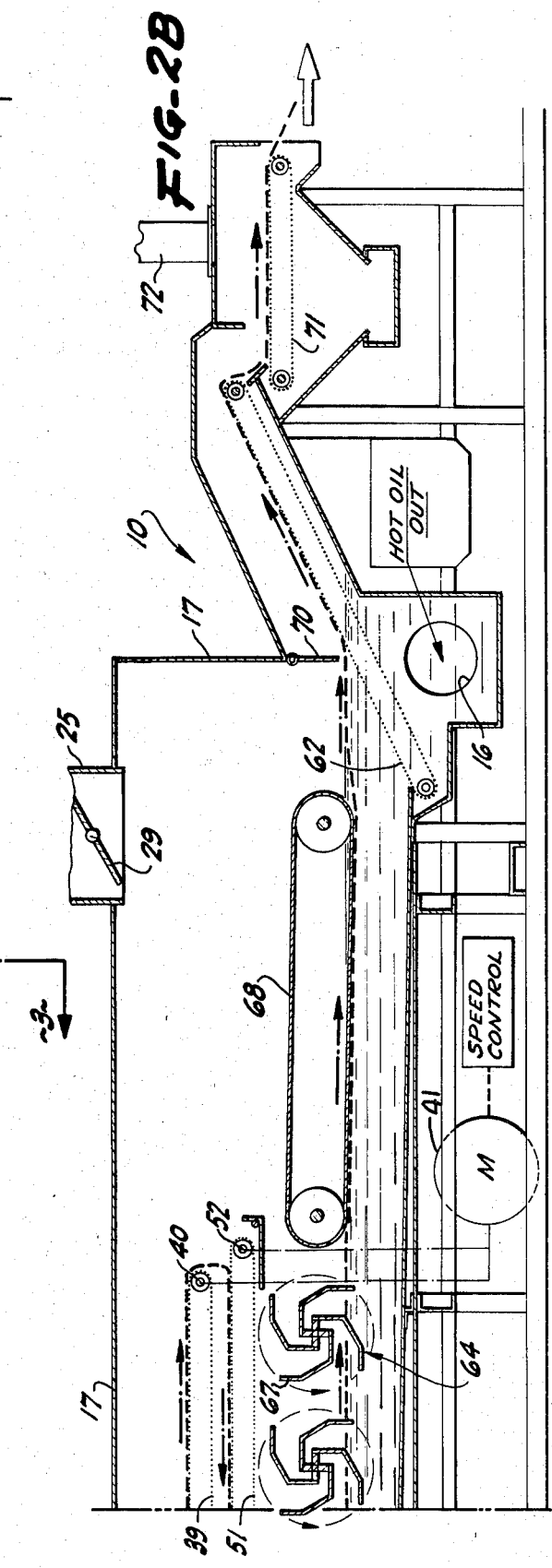

APPARATUS FOR PROCESSING FOOD PRODUCTS

This is a division of application Ser. No. 698,276 filed June 21, 1976, now abandoned.

BACKGROUND OF THE INVENTION

This invention relates in general to food processing, and in particular relates to the cooking of food products.

Many food products such as potato chips and french fries are conventionally cooked by immersion in a vat of heated frying medium. In one method for processing potato chips paddle wheels are rotated in the vat for controlling the speed of product movement so that the cooking time in the medium is controlled. The operation of such conventional equipment presents a number of problems and limitations. For example, oil mist from the vat as well as steam is carried away through a stack with the result that a considerable amount of oil and heat energy is lost. In fact, positive steps were taken to prevent the oil mist from re-entering the vat with the thought of minimizing contamination of the vat contents by the free fatty acids of the mist. Therefore the operating cost is increased due to the lost oil and as well as the fuel which must be consumed for the equivalent amount of heat energy lost through the stack. The excess oil carried away through the stack also creates an air pollution problem. Moreover in the conventional cooking processes the presence of excess oxygen in the cooking chamber tends to degrade the frying medium and product quality. The processing methods employed with existing equipment also require a relatively high quality raw product to produce a suitable end product. In processing potato chips when potatoes with high sugar content are used the result is a dark or discolored end product. To reduce this discoloration the potato slices in many instances are blanched in hot water prior to frying to remove or reduce the sugar content. The need has therefore been recognized for food processing apparatus which will provide a solution to these problems.

OBJECTS AND SUMMARY OF THE INVENTION

It is a general object of the invention to provide new and improved apparatus for processing chip-type food products such as potato chips.

Another object is to provide food processing apparatus of the character described which recovers and conserves the frying cooking medium, and which recovers heat energy so that fuel is conserved.

Another object is to provide apparatus of the character described which evolves less waste of the frying cooking medium from the system so that air pollution is minimized.

Another object is to provide apparatus of the character described in which the time required for cooking the product is relatively less as compared to conventional processes, and in which the product throughput rate is relatively higher.

Another object is to provide apparatus of the character described in which the resulting food product has improved appearance and color relative to the quality of the raw product. A high quality potato chip product can be produced where a relatively imperfect raw potato is used and without the requirement for blanching.

Another object is to provide apparatus of the character described which pre-cooks the product in an atmosphere having high moisture so that exposure to oxygen is less and thereby product degradation is minimized, in which pre-cooked product itself serves as a filtering bed.

The invention in summary includes apparatus employing a vat for containing hot frying medium or oil which evolves oil mist upwardly into a pre-treatment chamber formed by a hood. The infeed product such as sliced and washed potatoes is moved along a pair of superposed perforate conveyors disposed over the vat within the chamber. The product is moved on the conveyors in contact with an atmosphere of the oil mist, air and steam. Conveyor speed control means is provided to control the rate of product movement so that the product is in contact with the atmosphere for a dwell time which is optimum for pre-cooking before deposit into the vat. The steam condenses on the product in the pretreatment zone with the latent heat of condensation heating the product so that energy is conserved. The oil mist contacts and deposits on the product in the zone, and this oil is carried back into the vat so that it is conserved. Movement of the product through the hot oil in the vat is controlled by rotating paddle wheels or other means so that the cooking time is optimum.

The foregoing and additional objects and features of the invention will appear from the following specification in which the preferred embodiments have been set forth in detail in conjunction with the accompanying drawings.

BRIEF DESCRIPTION OF THE DRAWINGS

FIG. 2A and 2B comprise a longitudinal section view of a portion of the apparatus of FIG. 1 to an enlarged scale showing the method of operation thereof.

DESCRIPTION OF THE PREFERRED EMBODIMENTS

Figure 3:
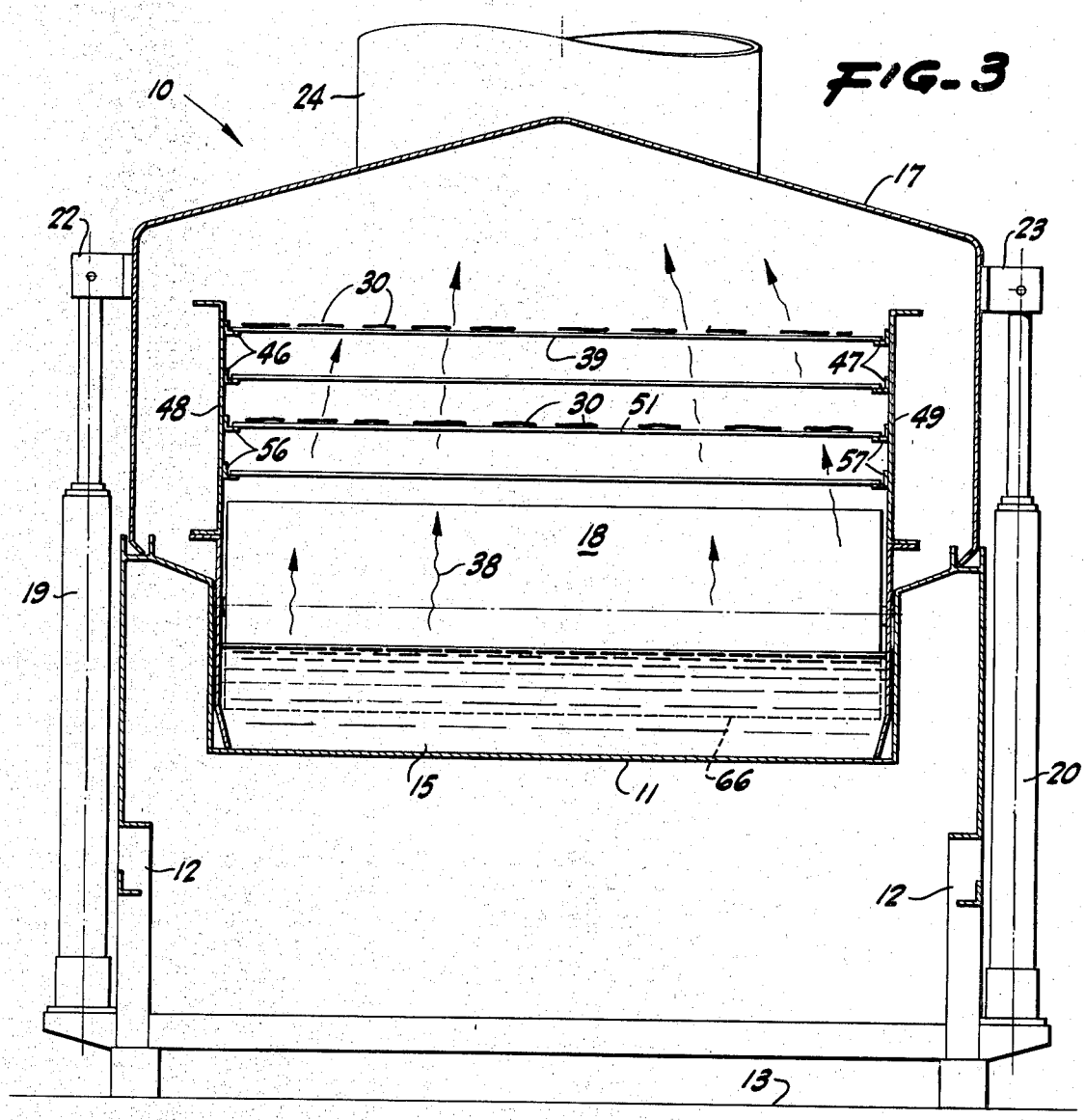
FIG. 3 is a cross-sectional view to an enlarged scale taken along the line 3—3 of FIG. 2A.

In the drawings FIGS. 2A and 2B illustrate generally at 10 apparatus for carrying out the invention in the processing and cooking of potato chips. While the processing of potato chips will be specifically described herein, it is understood that the invention has application for cooking other food products which can be either whole or sliced or cut into any desired shape or pattern, e.g. french fried potatoes or an extruded or prefabricated product.

Apparatus 10 includes an elongate, upwardly open vessel or vat 11 supported on a frame 12 above a suitable foundation 13. The vat is adapted to contain a reservoir 15 of heated cooking or frying medium. The frying medium can be any suitable animal fat or vegetable oil, either fully or partially hydrogenated, such as cottonseed oil, soy bean oil, olive oil, peanut oil, palm oil and blends of the foregoing fats and oils. The oil is heated by means of an external heat exchanger, not shown, which can be heated by suitable means such as steam or by a burner using a fuel, e.g. gas or fuel oil. The heated frying medium from the heat exchanger is forced by a suitable pump, not shown, through piping 14 into the upstream end of the vat, with return oil flowing back to the heat exchanger through a conduit connected with outlet 16 at the downstream end of the vat.

The bottom wall of the vat inclines downwardly toward the downstream end to assist the flow of oil. The oil is pumped to flow along the vat at a rate which is preferably in the range of 50 to 90 fpm.

An elongate dome-shaped hood 17 is mounted above the vat to define a pre-heat chamber or zone 18. The hood is supported by pairs of vertically extending hoist jacks 19, 20 mounted at their lower or head ends to the frame 12 and at their upper or rod ends to brackets 22, 23 attached to opposite sides of the hood. The jacks are actuated by suitable mechanical means, not shown, to raise and lower the hood for purposes of inspection and maintenance within the chamber. A pair of cylindrical vent stacks 24, 25 are mounted at opposite ends of the hood for exhausting waste steam and oil mist and air from the chamber, and the vent stacks connect with a common stack 26 which can feed into a vent scrubber, as required. Control dampers 28 and 29 are pivotally mounted in the lower ends of each stack for selectively controlling the rate of exhaust flow.

The raw product is fed into apparatus 10 by an endless conveyor 32 which inclines upwardly within a housing 33 from a slice washer tank 34. The washer tank in turn receives the sliced parts from a slicing machine 36 and feeder-hopper 37. The slices 30 are moved from the washer tank upwardly through an opening 43 in hood 17 into the pre-heat or pre-treatment zone 18.

Conveyor means is provided within pre-heat chamber 18 for moving the product slices 30 along a path over the vat and through an atmosphere of steam and the oil mist rising upwardly at 38 from the heated frying medium. The steam is evaporated from heating of the raw potato slices, which are comprised of approximately 80% water and 20% solids. The conveyor means includes an upper horizontal endless conveyor 39 formed of a perforate belt such as open mesh or flat wire construction. Conveyor 39 is driven by a roller 40 mounted transversely across the downstream end of the hood. Roller 40 in turn is driven by the preferred electric motor 41 in a direction to move the upper run and the product along a path 42 toward the downstream end of the hood. Conveyor 39 is trained around an idler roller 44 positioned to receive the washed slices which drop by gravity from the discharge end of feed conveyor 32. The side margins of the upper and lower runs of conveyor 39 are supported by means of angle irons 46, 47 secured to frames 48, 49 which are mounted within the pre-heat chamber above the vat.

The product drops from the discharge end of conveyor 39 onto the upper run of a lower horizontal endless conveyor 51 which is also formed of a perforate belt, such as open mesh or flat wire. The lower conveyor is driven by a roller 52 which is powered by motor 41 in a direction to carry the product along a path 53 through the atmosphere back toward the upstream end of the hood. The discharge end of lower conveyor 51 is trained around an idler roller 54 and the side margins of the upper and lower runs of this conveyor are supported by angle irons 56, 57 secured to frames 48 and 49.

Suitable motor speed control means 58 is provided to selectively control the speeds of the two conveyors so that the dwell time during which the product is in contact with the oil mist and steam atmosphere within the chamber 18 is optimum for the desired amount of dwell time prior to immersion in the vat oil. This dwell time is dependent upon factors such as the type of product, the frying medium employed, and the temperature within the pre-heat zone. For example, where the product is potato chips in a pre-heat atmosphere where the steam is superheated to a temperature in the range of 260°-295° F. then the dwell time preferably is in the range of 20 to 40 seconds. To obtain this dwell time the conveyor speed is therefore dependent upon the combined length of the runs of the two conveyors. Thus in this example where a dwell time of 30 seconds is desired and the combined conveyor run length is 30 ft. the conveyor speed would preferably be on the order of 60 fpm.

Figure 1:
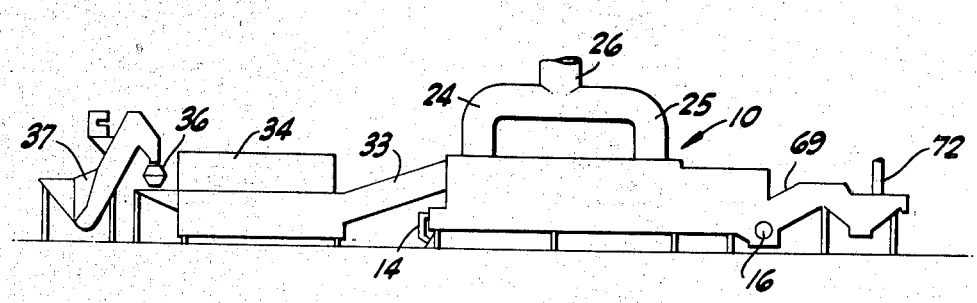
FIG. 1 is a side elevation view of apparatus incorporating the invention.

The partially pre-cooked product drops from the discharge end of lower conveyor 51 and falls through the path 60 into the upstream end of vat 11 where it is immersed in the bath of heated oil. The product floats in the oil and is advanced along the path 61 by the flow of oil being pumped through the vat. The rate of movement of the product in the bath is controlled by paddle wheel means so that an optimum cooking time within the oil is achieved before removal by an upwardly inclined endless conveyor 62 mounted at the downstream end of the vat. The paddle wheel means comprises a plurality of wheels 63, 64 spaced apart along the length of the vat and rotatably mounted on transverse axles which are conjointly rotated in a counterclockwise directions, as viewed in FIG. 1, by a suitable motor, not shown. Each of the wheels carries a plurality of transversely extending blades or paddles 66, 67 which turn downwardly below the surface of the oil so as to continually dunk or immerse the product while at the same time restraining forward movement of the product at the selected rate. The rotational speed of the paddles varies according to the length of the vat to achieve the desired cooking time. For example, where the product is sliced potato chips and where the vat length is on the order of 24 feet then the paddle wheels are rotated at a speed to achieve an immersed cooking time in the oil on the order of 2 minutes and 7 seconds. This cooking time is substantially less than the cooking time of from 2 minutes 20 seconds to 2 minutes 25 seconds of conventional cooking apparatus. This reduction in cooking time which is achieved by the invention permits a relatively higher throughput capacity.

The product which moves away from the tail-end paddle wheel 64 floats with the oil into contact with the lower run of a submerger conveyor 68 which is operated to advance the product downstream onto the upper run of inclined take-away conveyor 62. Conveyor 62 is operated to carry the product upwardly from the bath.

A flapper or baffle 70 hangs down from the lower end of hood 69 to limit the size of the opening above the oil and thereby limit air entry into the pre-heat zone. The product falls downwardly from conveyor 62 onto the upper run of a horizontal transfer conveyor 71 mounted below salter apparatus 72, which can be provided as required. The salter apparatus dispenses salt downwardly onto the product carried across by the transfer conveyor, and the product thereafter is directed to a further conveyor, not shown, for packaging.

The use and operation of the invention will be explained through a specific example in which the food product is potato chips. The frying medium selected for this example is cottonseed oil heated to a temperature of 375° F. in an external heat exchanger and pumped through conduit 14 into vat 11 to flow at a speed of 50 fpm. The paddle wheels are conjointly rotated at a speed of 1.75 rpm.

The raw potatoes are sliced in slicer 36, washed and rinsed in tank 34, and then deposited onto the upper run of feed conveyor 32. At this time the slices are at a temperature in the range of 50°-80° F. The product then drops onto the upper run of conveyor 39 which moves it along the first path 42. The product drops down onto the upper run of lower conveyor 51 which moves it along the return path 53 and subsequently discharges it into the heated oil of the vat. The hot oil with steam and air evolves into a mist which rises upwardly through the openings in the conveyors. The oil mist contacts and deposits on the slices, and the steam also condenses on the slices. The latent heat of condensation in the steam is transferred to the product which begins to cook, As the slices move along the conveyor they are heated to a temperature sufficient to vaporize a portion of their contained water into steam for subsequent condensation on the incoming slices. The steam in the atmosphere within the chamber below the pair of conveyors is superheated to a temperature on the order of 260°-295° F., and the temperature of the effluent discharging through the stacks is on the order of 190° F. The increased moisture within the pre-treatment atmosphere reduces the amount of available oxygen so that the degree of oxidation and degradation of oil and product during the cooking cycle is reduced.

Oil which adheres to the product in the pre-heat atmosphere remains on the product until it reaches the oil bath. Thus this amount of oil is recovered since it is not carried away through the stacks.

The slices falling into the oil bath float as they are carried downstream by the moving oil. The speed of the paddle wheels 63, 64 is less than the oil flow rate so that the paddle wheels restrain the product movement to achieve a cooking time within the vat of 2 minutes and 7 seconds. At the same time the downward movement of the paddle blades continually dunk or immerse the slices for uniform contact with the oil. The slices are then directed rearwardly by submerged conveyor 68 onto take-away conveyor 62 which deposits the slices on conveyor 71 of the salter. The potato chips are then conveyed away for packaging.

One specific example of the processing of potato chips by the foregoing method and apparatus produced the following operating data and measurements. The apparatus with applicant's invention provided a product throughput capacity of approximately 12% greater than equipment not employing the invention. The oil disappearance was approximately 5½% less with applicant's invention. The vent stack temperature was 190° F. as compared to a stack temperature of 265° F. with equipment not employing the invention. Measurement of the stack effluent showed that there was 4.5% less oil vapor in the stack using applicant's invention as compared to equipment not employing the invention. Applicant's invention also reduced the cooking time in the oil by 9.3% and reduces the free fatty acid content of the oil bath by substantially 40%. The reduction of free fatty acid content in the product, it will be understood, gives a longer shelf life.

Although in the configuration disclosed the pre-cooking unit and the pre-treatment zone is located above the cooking vat, it is contemplated that the principles of the invention embrace a construction wherein the pre-cooking unit is separate component from the cooker. Further, a single run conveyor system may be used in the pre-treatment zone.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. Apparatus for cooking a starch-containing food product with a frying medium, comprising the combination of a vat for containing a reservoir of heated frying medium which evolves a mist of the medium, a pre-treatment chamber communicating with the vat, with the chamber containing an atmosphere which includes the mist, air and steam at a temperature of at least 100° C., an endless perforate conveyor for moving the product on an upper path and thereafter along a lower path beneath the upper path through said atmosphere with the mist and steam respectively depositing and condensing on the product so that the latent heat of such condensation begins gelatinization of the starch for partially cooking the product, speed control means for controlling the speed of the conveyor to maintain the product in contact with the mist for a dwell time in the range of twenty to forty seconds, said conveyor directing the partially cooked product into the frying medium in the vat where the product is cooked, paddle wheel means rotatably moving in the reservoir for continually immersing the product and also for controlling the speed of movement of the product through the vat for maintaining the product in contact with the frying medium for a time which is optimum to complete cooking of the product.

2. Apparatus as in claim 1 in which the vat includes a submerger conveyor having a lower reach moving along the upper surface layer of the frying medium along the length of the vat for moving the product away from the paddle wheel means while submerging the product within the frying medium.

3. Apparatus as in claim 2 in which an inclined conveyor is mounted in the vat downstream from the submerger conveyor, and means for operating the inclined conveyor for moving the product upwardly out of the frying medium for discharge from the apparatus.

4. Apparatus as in claim 3 which includes a hood mounted over the vat with an opening in the hood through which the inclined conveyor extends, and a baffle hanging from the end of the hood over the opening and the inclined conveyor for limiting entry of air into the pretreatment chamber.

* * * * *